US012577865B1

(12) United States Patent
Stewart et al.

(10) Patent No.: US 12,577,865 B1
(45) Date of Patent: Mar. 17, 2026

(54) HYDROGEN PRODUCTION FROM IRON-RICH FORMATIONS

(71) Applicant: Saudi Arabian Oil Company, Dhahran (SA)

(72) Inventors: Simon A. Stewart, Dhahran (SA); Serguey Viktorov Arkadakskiy, Alberta (CA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/013,691

(22) Filed: Jan. 8, 2025

(51) Int. Cl.
*E21B 43/26* (2006.01)
*C01B 3/06* (2006.01)
*C09K 8/60* (2006.01)
*C09K 8/68* (2006.01)
*C09K 8/70* (2006.01)
(Continued)

(52) U.S. Cl.
CPC ............ *E21B 43/2605* (2020.05); *C01B 3/06* (2013.01); *C09K 8/605* (2013.01); *C09K 8/68* (2013.01); *C09K 8/703* (2013.01); *E21B 7/04* (2013.01); *E21B 41/0035* (2013.01)

(58) Field of Classification Search
CPC .... E21B 43/2605; E21B 7/04; E21B 41/0035; C01B 3/06; C09K 8/605; C09K 8/68; C09K 8/703
See application file for complete search history.

(56) References Cited

U.S. PATENT DOCUMENTS 6,681,855 B2    1/2004    Zupanick et al.
7,811,445 B2    10/2010    Wellington et al.
(Continued)

FOREIGN PATENT DOCUMENTS

CN      114215601 A    3/2022
WO    WO 2008128331 A1    10/2008
(Continued)

OTHER PUBLICATIONS

Bacon et al., "Simulating geologic co-sequestration of carbon dioxide and hydrogen sulfide in a basalt formation," International Journal of Greenhouse Gas Control, Jun. 2013, (21):165-176, 15 pages.
(Continued)

*Primary Examiner* — Crystal J Lee
(74) *Attorney, Agent, or Firm* — Fish & Richardson P.C.

(57) ABSTRACT

A method for passively producing hydrogen from a geological formation includes drilling a plurality of lateral wellbores into an iron-rich geological formation from a mother wellbore extending from a surface location. Each of the plurality of lateral wellbores has an inclination along its length of less than 90 degrees. A biocide configured to inactivate hydrogen-consuming microbes is placed into the plurality of lateral wellbores and thereby into formation water that is flowed from the geological formation into the plurality of wellbores. Hydrogen gas effervesced from the formation water in the plurality of lateral wellbores is collected via the mother wellbore. The hydrogen gas is generated at least in part from a water reduction reaction of minerals of the geological formation with the formation water and risen through the plurality of lateral wellbores passively by buoyancy effects without pumping.

20 Claims, 6 Drawing Sheets

(51) Int. Cl.
  *E21B 7/04*      (2006.01)
  *E21B 41/00*      (2006.01)

(56)          References Cited

U.S. PATENT DOCUMENTS

| | | | |
|---|---|---|---|
| 10,502,863 | B2 | 12/2019 | Mosse et al. |
| 11,434,756 | B2 | 9/2022 | Samec et al. |
| 11,707,708 | B2 | 7/2023 | Ahmed et al. |
| 11,708,517 | B1 | 7/2023 | Onaizi |
| 2010/0190666 | A1* | 7/2010 | Ali ........................ C09K 8/605 |
| | | | 507/239 |
| 2015/0198022 | A1* | 7/2015 | Stanecki ................. E21B 43/24 |
| | | | 166/272.3 |
| 2016/0017206 | A1 | 1/2016 | Coates |
| 2022/0219112 | A1 | 7/2022 | Sigfusson et al. |
| 2022/0339576 | A1 | 10/2022 | Bergur et al. |
| 2023/0026695 | A1* | 1/2023 | Bosch .................... A01N 37/34 |
| 2023/0050105 | A1 | 2/2023 | Ben-Zvi et al. |
| 2023/0288099 | A1 | 9/2023 | Toews et al. |
| 2023/0323756 | A1 | 10/2023 | Darrah et al. |
| 2023/0391614 | A1 | 12/2023 | Johnson |

FOREIGN PATENT DOCUMENTS

| | | | | |
|---|---|---|---|---|
| WO | WO-2014160035 | A1 * | 10/2014 | ............. E21B 47/00 |
| WO | WO 2018227303 | A1 | 12/2018 | |
| WO | WO 2023007467 | A2 | 2/2023 | |

OTHER PUBLICATIONS

Chan et al., "Hydrogen sulfide (H2S) conversion to hydrogen (H2) and value-added chemicals: Progress, challenges and outlook," Chemical Engineering Journal, Feb. 2023, 458:141398, 2 pages.

Chinedu et al., "Review on clean hydrogen generation from petroleum reservoirs: Fundamentals, mechanisms, and field applications," International Journal Of Hydrogen Energy, Dec. 2023, 48(97):38188-38222, 35 pages.

Dokhon et al., "Pressure decline and gas expansion in underground hydrogen storage: A pore-scale percolation study," International Journal of Hydrogen Energy, 2024, 86:261-274, 14 pages.

Gupta et al., "Advances in sulfur chemistry for treatment of acid gases," Progress in Energy and Combustion Science, Nov. 2015, (54)65-92, 28 pages.

Heinemann et al., "Enabling large-scale hydrogen storage in porous media—the scientific challenges," Energy & Environmental Science, 2021, 1(4):853-864, 12 pages.

Lou et al., "Advances and challenges toward efficient utilization of H2S for H2 production," Renewable and Sustainable Energy Reviews, Jul. 2024, 199:114529, 9 pages (Abstract Only).

Macbeth et al., "Review Paper: Post-stack 4D seismic time-shifts: Interpretation and evaluation," Geophysical Prospecting, Dec. 2018, 67:3-31, 72 pages.

Meunier et al., "The glauconite-Fe-illite-Fe-smectite problem: a critical review," Terra Nova, 2007, 19(2):95-104, 10 pages.

Pooladi-Darvish et al., "Chromatographic partitioning of H2S and CO2 in acidgas disposal," Journal of Canadian Petroleum Technology, Oct. 2009, 48(10):52-57, 7 pages (Abstract Only).

Rappold et al., "Large scale disposal of waste sulfur: From sulfide fuels to sulfate sequestration," Energy, Mar. 2010, 35(3):1368-1380, 13 pages.

Snæbjörnsdóttir et al., "The chemistry and saturation states of subsurface fluids during the in situ mineralisation of CO2 and H2S at the CarbFix site in SW-Iceland," International Journal of Greenhouse Gas Control, 2017, 58:87-102, 46 pages.

Srivastava, "An evaluation of desulfurization technologies for sulfur removal from liquid fuels," RSC Advances, 2012, 2(3):759-783, 25 pages.

Suits et al., "Sulfur diagenesis and partitioning in Holocene Peru shelf and upper slope sediments," Chemical Geology, Feb. 2000, 163:219-234, 16 pages.

Xu et al., "Numerical modeling of injection and mineral trapping of CO2 with H2S and SO2 in a sandstone formation," Chemical Geology, Jun. 2008 ,242(3):319-346, 61 pages.

Zhang et al., "Modeling of fate and transport of coinjection of H2S with CO2 in deep saline formations," Journal of Geophysical Research, 2011, 116:B02202, 13 pages.

Zhu et al., "An accurate model for estimating H2 solubility in pure water and aqueous NaCl solutions," Energies, Jul. 2022, 15:5021, 15 pages.

Boulart et al., "Differences in gas venting from ultramafic-hosted warm springs: the example of Oman and Voltri Ophiolites," Dec. 2013, 38(2), 43 pages.

Coveney Jr., "Serpentinization and the Origin of Hydrogen Gas in Kansas," AAPG Bulletin, Jan. 1987, 71(1):39-48, 11 pages.

Delamaide, "Application of multilateral wells for production and enhanced oil recovery: Case studies from Canada," SPE Reservoir Evaluation & Engineering, Nov. 2021, 24(4):952-974, 2 pages (Abstract Only).

Geymond et al., "Can Weathering of Banded Iron Formations Generate Natural Hydrogen? Evidence from Australia, Brazil and South Africa," Minerals, 2022, 12(2), 163, 28 pages.

Jackson et al., "Natural hydrogen: sources, systems and exploration plays," Geoenergy, Dec. 2024, 2(1), 9 pages.

Liu et al., "Mantle serpentinization and associated hydrogen flux at North Atlantic magma-poor rifted margins," Geology, 2023, 51(3):284-289, 6 pages.

Loiseau et al., "Hydrogen generation and heterogeneity of the serpentinization process at all scales: Turon de Tecouère lherzolite case study, Pyrenees (France)," Geoenergy, Feb. 2024, 2 pages (Abstract Only).

Maiga et al., "Trapping processes of large volumes of natural hydrogen in the subsurface: The emblematic case of the Bourakebougou H2 field in Mali," International Journal of Hydrogen Energy, Jan. 2024, 50(B):640-647, 15 pages.

McCollom et al., "Temperature Trends for Reaction Rates, Hydrogen Generation, And Partitioning of Iron During Experimental Serpentinization of Olivine," Geochimica et Cosmochimica Acta, May 15, 2016, 181, 74 pages.

Miller et al., "Low temperature hydrogen production during experimental hydration of partially-serpentinized dunite," Geochimica et Cosmochimica Acta, 2017, 209, 52 pages.

Moretti et al., "Hydrogen Emanations in Intracratonic Areas: New Guide Lines for Early Exploration Basin Screening, " Geosciences, Mar. 22, 2021, 11(3), 145.

Osselin et al., "Orange hydrogen is the new green," Nature Geoscience, 2022, 15(10), 22 pages.

Prinzhofer et al., "Discovery of a large accumulation of natural hydrogen in Bourakebougou (Mali)," International Journal of Hydrogen Energy, Oct. 18, 2018, 43(42):19315-19326, 12 pages.

Truche et al., "A deep reservoir for hydrogen drives intense degassing in the Bulqizë ophiolite," Science, Feb. 9, 2024, 383, 6683, 618-621, 4 pages.

* cited by examiner

HYDROGEN PRODUCTION FROM IRON-RICH FORMATIONS

TECHNICAL FIELD

The present disclosure relates to production of subsurface resources. More specifically, the disclosure describes techniques for production of hydrogen gas from iron-rich geological formations.

BACKGROUND

Hydrogen is a sought-after commodity with a global demand of approximately 95 million tons per year. This demand is currently met largely by energy- and carbon-intensive manufacturing methods such as steam-reformation of methane to produce hydrogen with carbon monoxide byproduct, or electrolysis of water which yields hydrogen and oxygen. These methods are power-hungry, significant industrial processes. Global economic scenarios have increases in future demand for hydrogen.

SUMMARY

Certain aspects of the subject matter herein can be implemented as a method for passively producing hydrogen from a geological formation. The method includes drilling a plurality of lateral wellbores into an iron-rich geological formation from a mother wellbore extending from a surface location. Each of the plurality of lateral wellbores has an inclination along its length of less than 90 degrees. A biocide configured to inactivate hydrogen-consuming microbes is placed into the plurality of lateral wellbores and thereby into formation water that is flowed from the geological formation into the plurality of wellbores. Hydrogen gas effervesced from the formation water in the plurality of lateral wellbores is collected via the mother wellbore. The hydrogen gas is generated at least in part from a water reduction reaction of minerals of the geological formation with the formation water and risen through the plurality of lateral wellbores passively by buoyancy effects without pumping.

Certain aspects of the subject matter herein can be implemented as a system for passively producing hydrogen from a geological formation. The system includes a plurality of lateral wellbores drilled into an iron-rich geological formation from a mother wellbore extending from a surface location. Each of the plurality of lateral wellbores has an inclination along its length of less than 90 degrees. The system further includes a biocide flowing through the plurality of lateral wellbores and configured to inactivate hydrogen-consuming microbes within formation water flowed from the geological formation into the plurality of wellbores. The system further includes a collection system for collecting, via the mother wellbore, hydrogen gas effervesced from the formation water in the plurality of lateral wellbores. The hydrogen gas is generated at least in part from a water reduction reaction of minerals of the geological formation with the formation water and risen through the plurality of lateral wellbores passively by buoyancy effects without pumping.

DESCRIPTION OF DRAWINGS

Like reference numbers and designations in the various drawings indicate like elements.

DETAILED DESCRIPTION

Figure 1:
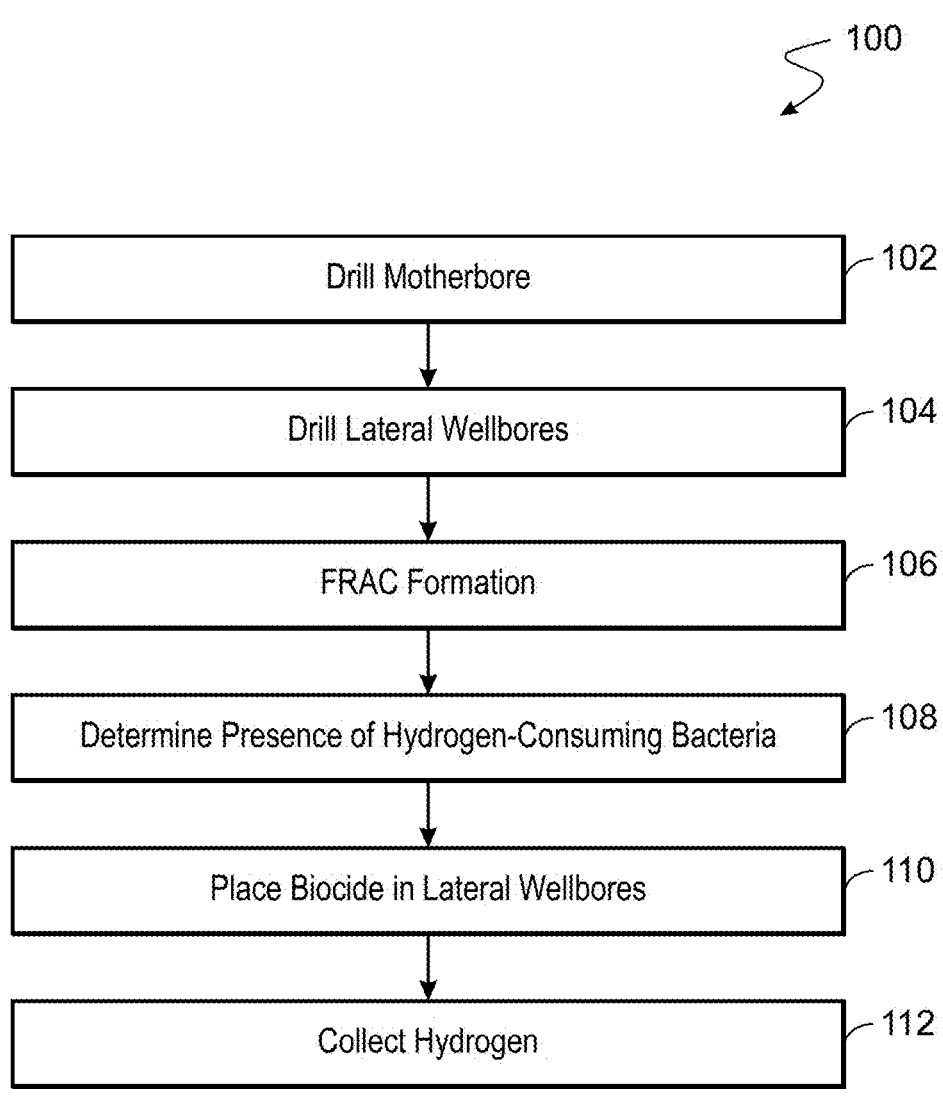
FIG. 1 is an illustration of an example process for hydrogen production in accordance with one or more embodiments of the present disclosure.

Iron-rich geological formations can be found in many geological environments, including, for example, oceanic crust or in ophiolite formations or geobodies. Iron rich rocks may also occur in the form of sedimentary formations such as banded iron formations. An iron-rich geological formation can be, for example, a geological formation having an average iron content of at least five weight percent (5 wt %). In some instances, an iron-rich formation can have a greater average iron content greater than five weight percent (for example 15 wt % or greater). In some instances, an iron-rich formation can have a average iron content lower than five weight percent (for example, 0.5% or less). Iron silicate minerals in such formations, for example olivine ((Mg,Fe)$_2$SiO$_4$), can readily react with water in a process known as serpentinization to produce various hydrated mineral products such as serpentine and brucite, plus liberated hydrogen (H$_2$). More specifically, the hydrogen is generated through oxidation of ferrous iron (Fe$^{2+}$) released from the dissolving olivine to ferric iron (Fe$^{3+}$) that precipitates in serpentine and magnetite. Other subsurface water-reducing reactions besides serpentinization can generate hydrogen from a variety of iron minerals (including but not limited to silicates, oxides, carbonates, sulphides, and others). Some such reactions may in some subsurface conditions be faster or result in greater hydrogen generation than serpentinization.

In accordance with embodiments of the present disclosure, hydrogen produced from water reduction reactions with iron minerals (such as, for example, serpentinization) can be passively produced from a geological formation. A plurality of wellbores can be drilled into an iron-rich formation. In some instances the wellbores are lateral wellbores inclined from vertical but having an inclination of less than 90 degrees. That is, no portion of the lateral wellbores has an inclination of 90 degrees or greater. In some instances, lateral/inclined sections can be completed as open hole completions (barefoot completions) to allow direct access to the hydrogen producing formation over long intervals (for example, hundreds to thousands of metres). In circumstances in which the hydrogen-producing rock is prone to instability or collapse the wellbore sections can be lined with, for example, a slotted liner. Formation water is permitted to enter the wellbores through those open hole and/or lined intervals. Hydrogen gas generated from water reduction reactions by Fe$^{2+}$ such as serpentinization of minerals of the geological formation with the formation water effervesces from the ambient formation water. However, such hydrogen may be rapidly consumed by bacteria or other microbes, particularly if formation temperatures are lower than about 100° C. In such cases, a biocide composition configured to inactivate hydrogen-consuming microbes can be placed into the ambient formation water that has seeped into the lateral wellbores from the formation. The hydrogen can then be collected from the lateral wellbores via a mother wellbore (from which the laterals branch) extending to the surface.

After the drilling and biocide injection operations are completed, the system can run passively: no pumping may be necessary, as the hydrogen gas will flow to the wellhead of the mother wellbore driven initially by diffusion and then by buoyancy effects.

FIG. 1 is an illustration of an example process for hydrogen production in accordance with one or more embodiments of the present disclosure. In preparation, regional geological mapping can be conducted to identify suitable geological formations or geobodies for the hydrogen-generation process according to criteria such as, but not limited to, rock type, average iron content, rock volume, state of weathering or oxidation, existing fractures, and ease of access. Detailed prospect characterization of the sites can follow. Prospect characterization can be done with various combinations of exploratory wells, reflection seismic, field mapping and potential field data to constrain the above such criteria. Such data can be integrated into a three-dimensional model. A suitable well system for hydrogen production can then be constructed.

Figure 2:
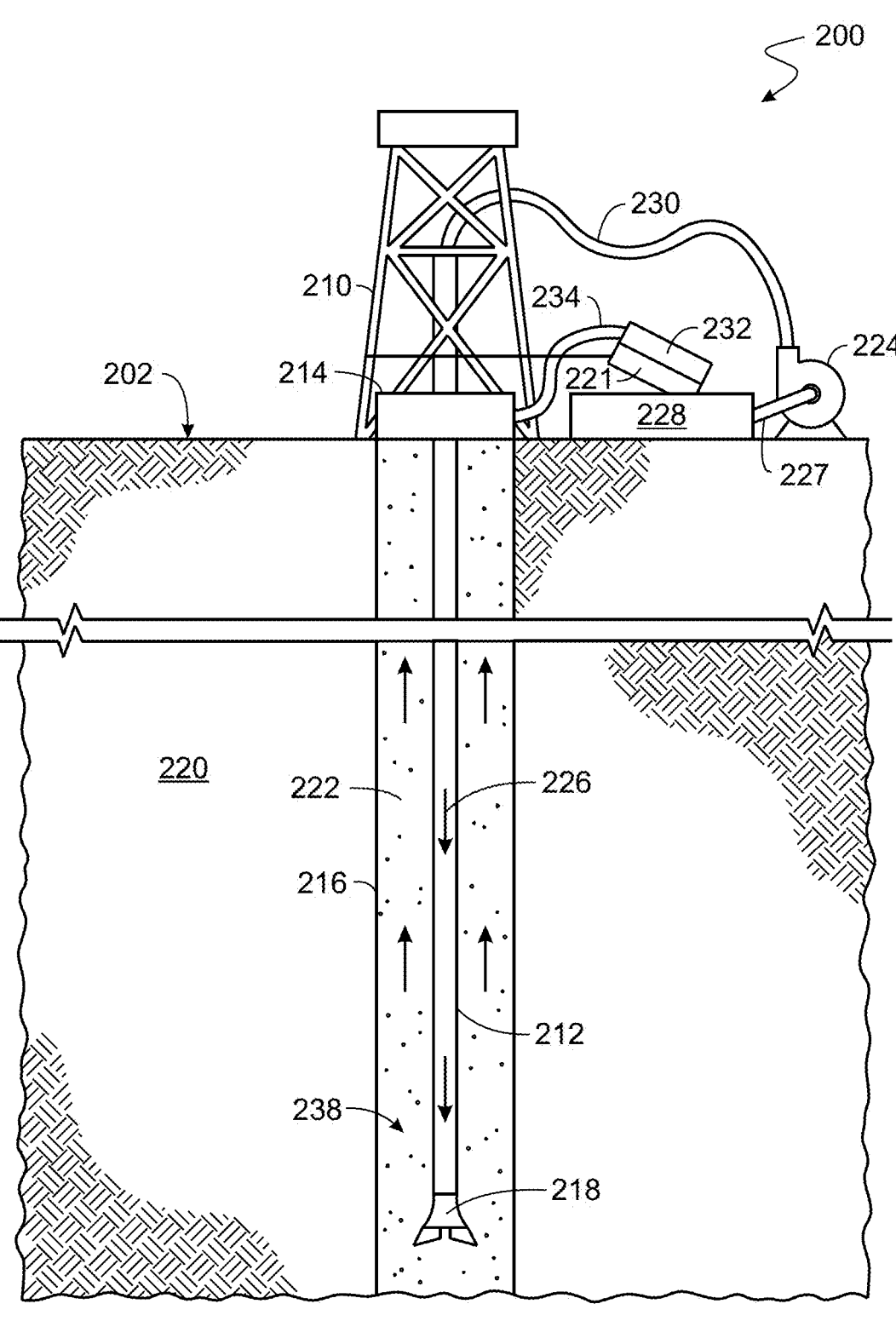
FIG. 2 is a schematic illustration of a system for drilling a well system in accordance with one or more embodiments of the present disclosure.

Construction of a well system commences at step 102 with the drilling of an initial mother wellbore. Drilling can be accomplished using a drill system 200 as shown in FIG. 2. Drilling system 200 includes a derrick 210 on surface 202 that supports the weight of and permits selective positioning of a drill string 212 through a blowout preventer 214 at the wellhead of a wellbore 216. The drill string 212 has a downhole end coupled to a drill bit 218 operable to drill the wellbore 216 in an iron-rich geological formation 220. To facilitate drilling and removal of drill cuttings 222, a circulation pump 224 circulates drilling fluid 226 though the wellbore 216. An inlet of a circulation pump 224 is coupled to a reservoir for the drilling fluid through a first pipe 227. In the illustrated system, the reservoir is a mud pit 228. In some systems, reservoir can be, for example, a tank or tanks. A pump discharge of the circulation pump 224 is coupled to a top end of the drill string 212 through a second pipe 230. The blowout preventer 214 is coupled to a shaker table 132 through a third pipe 234. The mud pit 228 is coupled to the shaker table 232 and receives the drilling fluid 226 from the shaker table 232. During drilling, the drilling fluid 226 is pumped from the mud pit 228 and flows through the first pipe 227 into the pump suction of the circulation pump 224. The circulation pump 224 then pumps the drilling fluid 226 from the pump discharge to the top end of the drill string 212 through the second pipe 230.

Figure 3A:
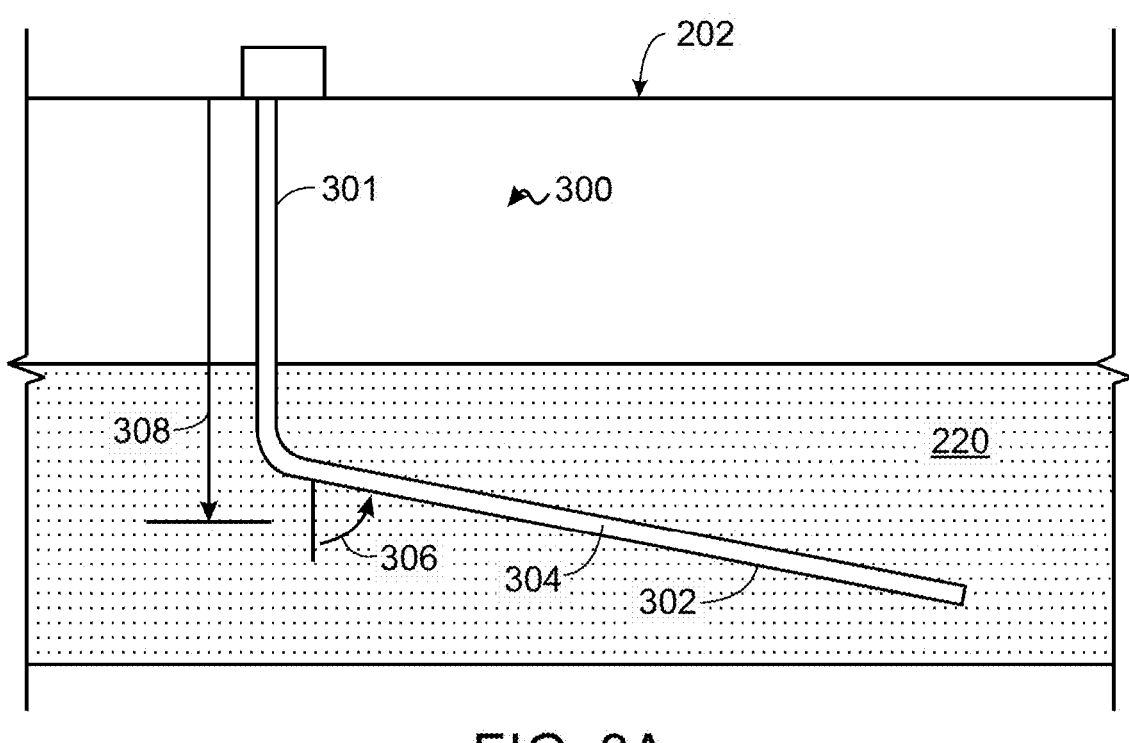
FIGS. 3A-3C are schematic cross-sectional illustrations of a well system in accordance with one or more embodiments of the present disclosure.
Figure 3B:
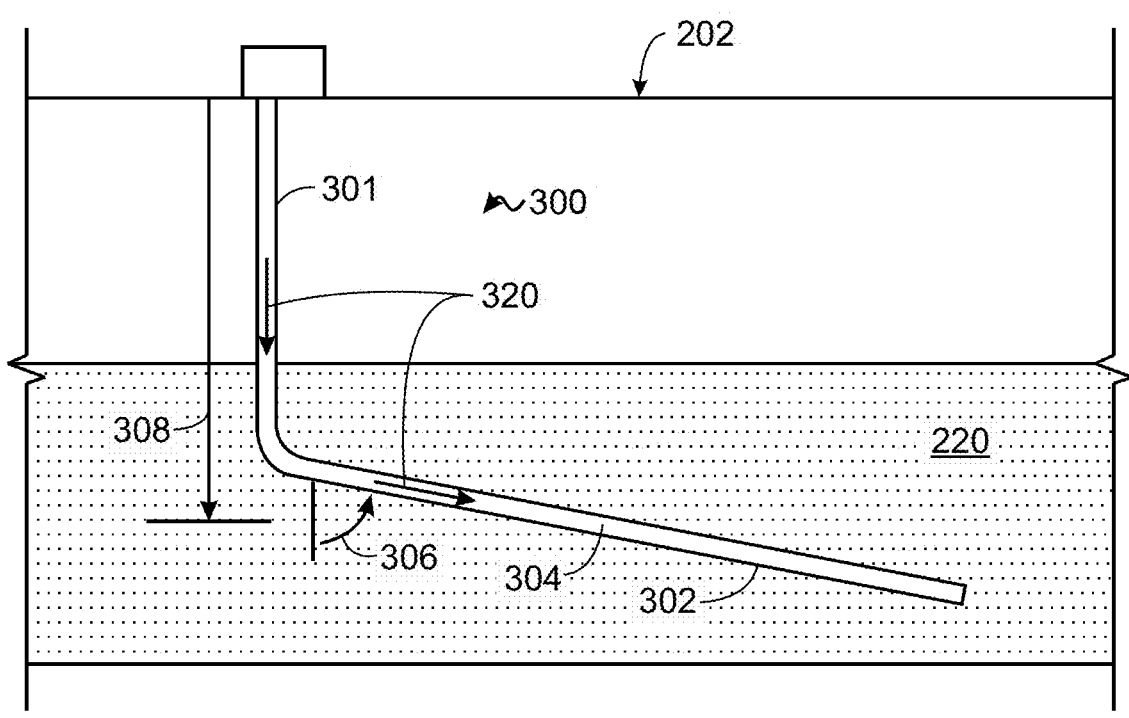
Figure 3C:
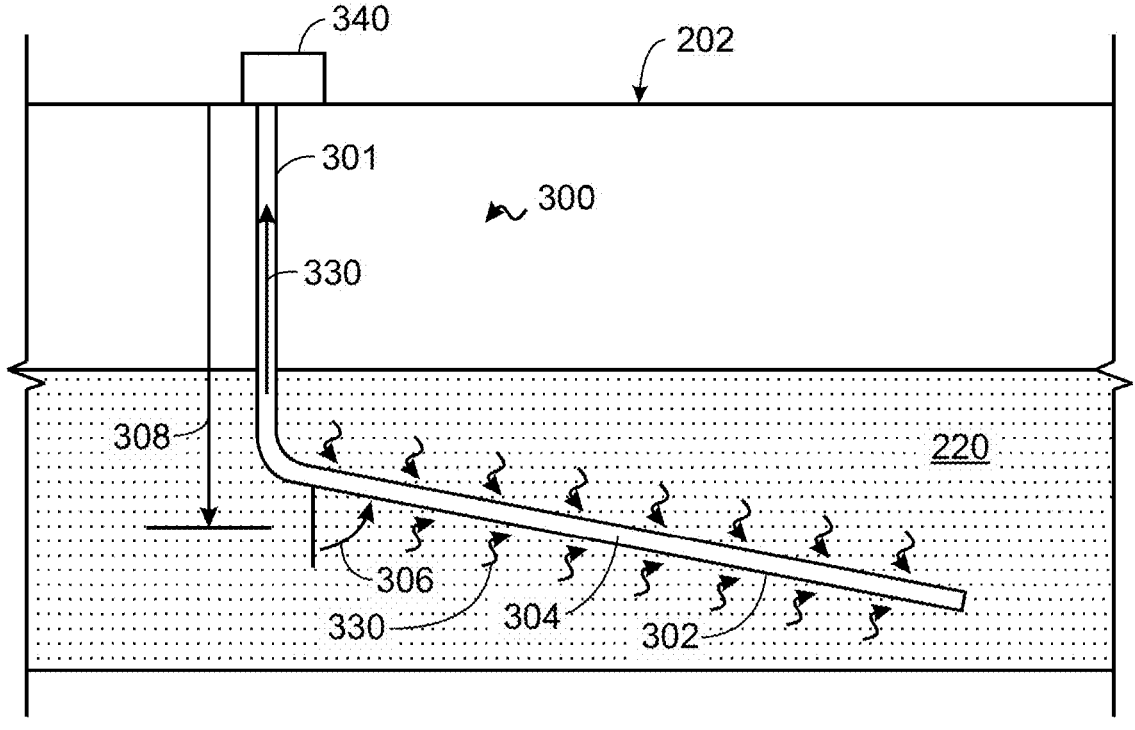

As shown in cross-sectional views of a hydrogen producing system 300 of FIGS. 3A-3C, an initial wellbore 216 of system can serve as a mother bore 301 from which (at step 104) one or more lateral wellbores 302 can be drilled. Lateral wellbores 302 can be deflected from mother bore 301 (and/or from each other) using whipstocks and standard methods of drilling of multilateral wellbores such as rotary steerable systems. After drilling, drill string 212 and drill fluid 226 can be removed from the wellbore, the wellbore can be circulated with, for example, pure water or water with various solutes, plus biocide (as described in more detail below) and formation water 304 allowed to flow (seep) into the wellbores.

One or more of the lateral wellbores 302 can be drilled at an inclination (306) from mother bore 301. In some embodiments, lateral wellbores are neither vertical (no inclination) nor horizontal (90° angle of inclination) but instead have an inclination 306 of less than 90°. That is, in some embodiments, no portion of the lateral wellbores has an inclination of 90° or greater. Such an inclination provides for a pressure gradient within the fluids inside the wellbore 304 and can substantially prevent a formation of gas caps within the lateral wellbores along their respective length as gas travels to the surface therethrough. That is, without any upward bends or arcs of the lateral wellbores greater than 90° from vertical, there would be no pockets along the length of the wellbore for the relatively less dense gas to collect. The pressure head of the fluid column in the wellbore can be quantified using the expression pressure equals fluid density multiplied by gravitational acceleration multiplied by depth 308. This pressure gradient along the wellbore permits fluids lighter than water (such as hydrogen gas bubbles) to flow naturally and passively up the well to surface, without the need for pumping. As hydrogen is produced at the water-rock interface, the liberated hydrogen molecules will initially move into the wellbore fluid as a solute, tending to produce an even saturation of hydrogen along the wellbore where it is exposed to the ferrous rock. However, the decreasing fluid pressure along the wellbore in the direction of mother bore 301, achieved by the inclination constraint, causes hydrogen to move out of solution where the fluid pressure is lower, according to Henry's law that states the amount of dissolved gas in a liquid is proportional to the gas' partial pressure above the liquid. Specific well inclination can be chosen based on, for example, the geometry of the geobody and other engineering constraints.

Figure 4A:
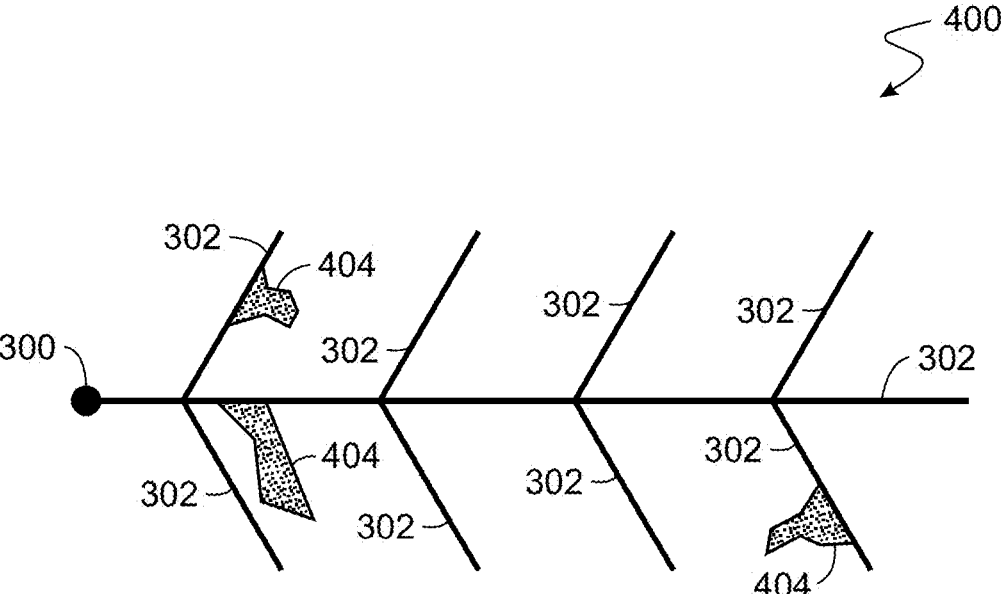
FIGS. 4A-4B are plan views of a well system in accordance with one or more embodiments of the present disclosure.
Figure 4B:
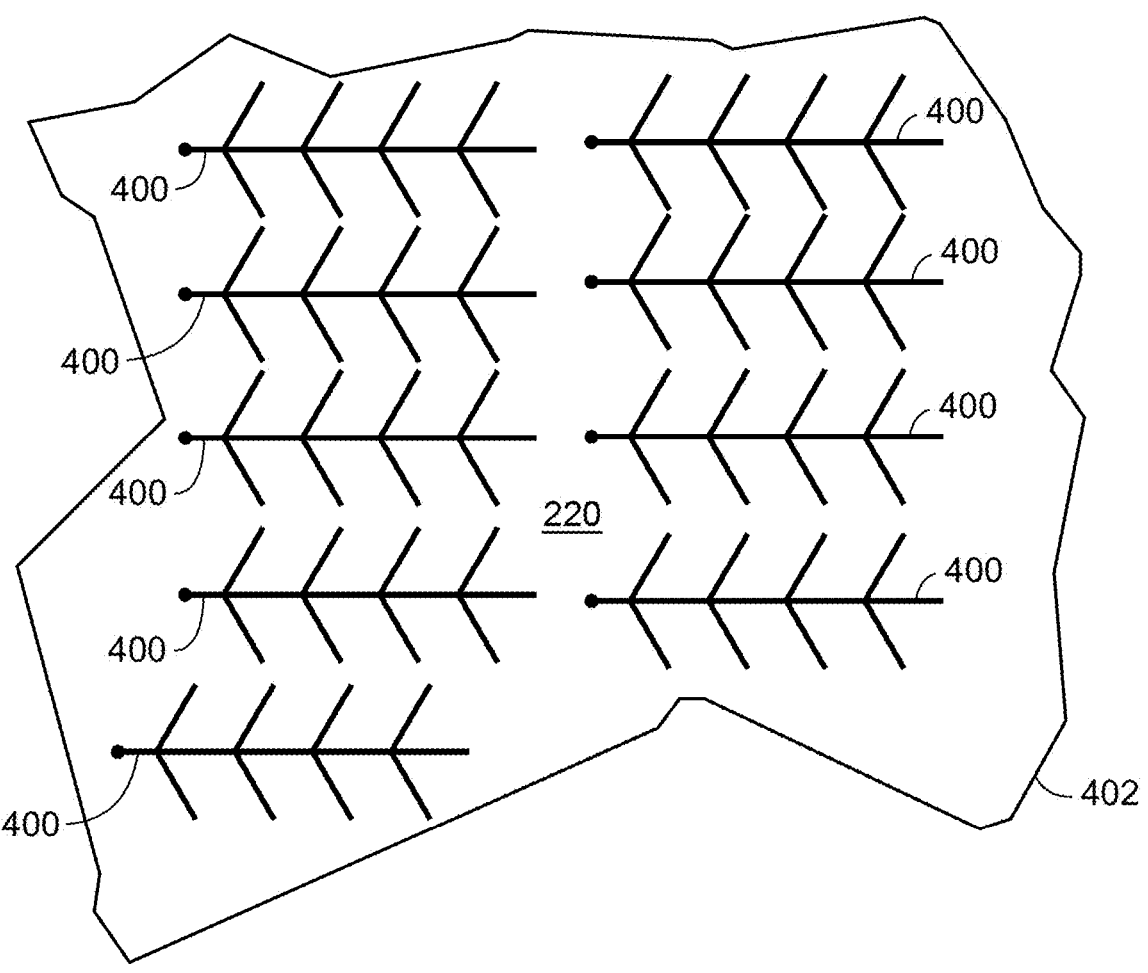

In some embodiments, lateral wellbores 302 can be sidetracked from each other into multiple branches, such as a feather or fish-bone pattern 400 as shown in FIG. 4A. As shown in FIG. 4B, many such mother bores 301 can be arranged in such a way that multiple patterns 400 give a high degree of surface-area exposure to the target rock volume 402 of formation 220, in effect imposing artificial permeability. Also as shown in FIG. 4A (and at step 106 of FIG. 1), wellbore fluids can be pressured up to induce a subsurface fractures 404, further increasing the surface area in contact with the ferrous minerals within formation 220. xxxx Proceeding to step 108 of FIG. 1, tests can be conducted to determine the presence of hydrocarbon-consuming microbes within formation 220. For example, a wide variety of facilitative anaerobic microorganisms (bacteria and archaea) can be present in a subsurface environment. In addition, microorganisms could be present that have been introduced from the surface as a result of drilling, circulation, or other wellbore operations. Such microbes can be particularly present in great numbers in formations (or portions thereof) having a formation temperature of less than about eighty degrees (80°) Celsius An appropriate biocide composition (such didecyldimethylammonium chloride) can be formulated based on downhole temperatures, pressures and chemistries present within boreholes 302 and the surrounding formation 220. At step 110, and as shown in FIG. 3B, the biocide composition 320 can be injected or otherwise placed into wellbores 302. In some embodiments, the biocide can be included in the fracking fluid used to frac formation 220 in step 106. So configured, hydrogen gas 330 generated from water-reducing reactions of minerals of the geological formation 220 (such as serpentinization) can collect within formation water. Proceeding to step 112, and as shown in FIG. 3C, the hydrogen gas 330 effervescing from the formation water in the plurality of lateral wellbores can be collected via mother bore 301 by natural flow up the pressure gradient induced by the well inclination. The hydrogen gas can be collected via a collection system 340 comprising suitable collection, purification, and separation equipment, such as a membrane system or cryogenic system. In accordance with some embodiments, with the system configured as described above, no pumping is necessary and the overall system can thus operate passively, as the hydrogen gas will flow to the wellhead of the mother wellbore by buoyancy effects alone. Because of hydrogen's propensity to damage or embittle steel and other materials, casings or other wellbore liners that transports hydrogen to the surface and related surface components can be comprised of a hydrogen-resistant material such as SS-H2 stainless steel. Several implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is applicable to at least a computer-implemented method; a non-transitory, computer-readable medium storing computer-readable instructions to perform the computer-implemented method; and a computer system comprising a computer memory inter-operably coupled with a hardware processor configured to perform the computer-implemented method or the instructions stored on the non-transitory, computer-readable medium.

Several embodiments have been described. Nevertheless, it will be understood that various modifications may be made without departing from the scope of the present disclosure. Accordingly, other embodiments are within the scope of the following claims.

Examples

In a first aspect, a method for passively producing hydrogen from a geological formation includes drilling a plurality of lateral wellbores into an iron-rich geological formation from a mother wellbore extending from a surface location. Each of the plurality of lateral wellbores has an inclination along its length of less than 90 degrees. A biocide configured to inactivate hydrogen-consuming microbes is placed into the plurality of lateral wellbores and thereby into formation water that is flowed from the geological formation into the plurality of wellbores. Hydrogen gas effervesced from the formation water in the plurality of lateral wellbores is collected via the mother wellbore. The hydrogen gas is generated at least in part from a water reduction reaction of minerals of the geological formation with the formation water and risen through the plurality of lateral wellbores passively by buoyancy effects without pumping.

In a second aspect in accordance with the first aspect, the inclination of each of the lateral wellbores substantially prevents a formation of gas caps within the lateral wellbores along their respective length as hydrogen gas travels to the surface therethrough.

In a third aspect in accordance with the first or second aspects, a formation temperature of the iron-rich geological formation is equal to or less than eighty degrees Celsius.

In a fourth aspect in accordance with any of the first through third aspects, the iron-rich geological formation has an average ferrous iron content of at least five weight percent.

In a fifth aspect in accordance with any of the first through fourth aspects, the iron-rich geological formation has an average ferrous iron content of at least fifteen weight percent.

In a sixth aspect in accordance with any of the first to fifth aspects, the biocide comprises didecyldimethylammonium chloride.

In a seventh aspect in accordance with any of the first through sixth aspects, the method further comprising fracking the iron-rich geological formation by injecting a pressurized fluid into at least a portion of the plurality of lateral wellbores.

In an eighth aspect in accordance with any of the first through seventh aspects, the pressurized fluid comprises the biocide and wherein placing the biocide into the formation water comprises, at least in part, the injecting the pressurized fluid.

In a ninth aspect in accordance with any of the first through eighth aspects, the water reduction reaction comprises serpentinization.

In a tenth aspect in accordance with any of the first through ninth aspects, collecting the hydrogen gas comprises collecting hydrogen gas at the wellhead of the mother wellbore.

In an eleventh aspect, a system for passively producing hydrogen from a geological formation includes a plurality of lateral wellbores drilled into an iron-rich geological formation from a mother wellbore extending from a surface location. Each of the plurality of lateral wellbores has an inclination along its length of less than 90 degrees. The system further includes a biocide flowing through the plurality of lateral wellbores and configured to inactivate hydrogen-consuming microbes within formation water flowed from the geological formation into the plurality of wellbores. The system further includes a collection system for collecting, via the mother wellbore, hydrogen gas effervesced from the formation water in the plurality of lateral wellbores. The hydrogen gas is generated at least in part from a water reduction reaction of minerals of the geological formation with the formation water and risen through the plurality of lateral wellbores passively by buoyancy effects without pumping.

In a twelfth aspect in accordance with the eleventh aspect, the inclination of each of the lateral wellbores substantially prevents a formation of gas caps within the lateral wellbores along their respective length as hydrogen gas travels to the surface therethrough.

In a thirteenth aspect in accordance with the eleventh or twelfth aspects, a formation temperature of the iron-rich geological formation is equal to or less than eighty degrees Celsius.

In a fourteenth aspect in accordance with any of the eleventh through thirteenth aspects, the iron-rich geological formation has an average ferrous iron content of at least five weight percent.

In a fifteenth aspect in accordance with any of the eleventh through fourteenth aspects, the iron-rich geological formation has an average ferrous iron content of at least fifteen weight percent.

In a sixteenth aspect in accordance with any of the eleventh to fifteenth aspects, the biocide comprises didecyldimethylammonium chloride.

In a seventeenth aspect in accordance with any of the eleventh through sixteenth aspects, at least a portion of the iron-rich geological formation is fracked by injecting a pressurized fluid into at least a portion of the plurality of lateral wellbores.

In an eighteenth aspect in accordance with any of the eleventh through seventeenth aspects, the pressurized fluid comprises the biocide and wherein placing the biocide into the formation water comprises, at least in part, the injecting the pressurized fluid.

In a nineteenth aspect in accordance with any of the eleventh through eighteenth aspects, the water reduction reaction comprises serpentinization.

In a twentieth aspect in accordance with any of the eleventh through nineteenth aspects, the collection system comprises apparatus for collecting the hydrogen gas at the wellhead of the mother wellbore.

What is claimed is:

1. A method for passively producing hydrogen from a geological formation, the method comprising:
   from a mother wellbore extending from a surface location, drilling a plurality of lateral wellbores into an iron-rich geological formation, each of the plurality of lateral wellbores having an inclination along its length of less than 90 degrees;
   placing a biocide configured to inactivate hydrogen-consuming microbes into the plurality of lateral wellbores and thereby into formation water, the formation water flowed from the geological formation into the plurality of wellbores; and
   collecting, via the mother wellbore, hydrogen gas effervesced from the formation water in the plurality of lateral wellbores, the hydrogen gas generated at least in part from a water reduction reaction of minerals of the geological formation with the formation water and risen through the plurality of lateral wellbores passively by buoyancy effects without pumping.

2. The method of claim 1, wherein the inclination of each of the lateral wellbores substantially prevents a formation of gas caps within the lateral wellbores along their respective length as hydrogen gas travels to the surface therethrough.

3. The method of claim 1, wherein a formation temperature of the iron-rich geological formation is equal to or less than eighty degrees Celsius.

4. The method of claim 1, wherein the iron-rich geological formation has an average ferrous iron content of at least five weight percent.

5. The method of claim 1, wherein the iron-rich geological formation has an average ferrous iron content of at least fifteen weight percent.

6. The method of claim 1, wherein the biocide comprises didecyldimethylammonium chloride.

7. The method of claim 1, further comprising fracking the iron-rich geological formation by injecting a pressurized fluid into at least a portion of the plurality of lateral wellbores.

8. The method of claim 7, wherein the pressurized fluid comprises the biocide and wherein placing the biocide into the formation water comprises, at least in part, the injecting the pressurized fluid.

9. The method of claim 1, wherein the water reduction reaction comprises serpentinization.

10. The method of claim 1, wherein collecting the hydrogen gas comprises collecting hydrogen gas at the wellhead of the mother wellbore.

11. A system for passively producing hydrogen from a geological formation, the system comprising:
   a plurality of lateral wellbores drilled into an iron-rich geological formation from a mother wellbore extending from a surface location, each of the plurality of lateral wellbores having an inclination along its length of less than 90 degrees;
   a biocide flowing through the plurality of lateral wellbores and configured to inactivate hydrogen-consuming microbes within formation water flowed from the geological formation into the plurality of wellbores; and
   a collection system for collecting, via the mother wellbore, hydrogen gas effervesced from the formation water in the plurality of lateral wellbores, the hydrogen gas generated at least in part from a water reduction reaction of minerals of the geological formation with the formation water and risen through the plurality of lateral wellbores passively by buoyancy effects without pumping.

12. The system of claim 11, wherein the inclination of each of the lateral wellbores substantially prevents a formation of gas caps within the lateral wellbores along their respective length as hydrogen gas travels to the surface therethrough.

13. The system of claim 11, wherein a formation temperature of the iron-rich geological formation is equal to or less than eighty degrees Celsius.

14. The system of claim 11, wherein the iron-rich geological formation has an average ferrous iron content of at least five weight percent.

15. The system of claim 11, wherein the iron-rich geological formation has an average ferrous iron content of at least fifteen weight percent.

16. The system of claim 11, wherein the biocide comprises didecyldimethylammonium chloride.

17. The system of claim 11, wherein at least a portion of the iron-rich geological formation is fracked by injecting a pressurized fluid into at least a portion of the plurality of lateral wellbores.

18. The system of claim 17, wherein the pressurized fluid comprises the biocide.

19. The system of claim 11, wherein the water reduction reaction comprises serpentinization.

20. The system of claim 11, wherein the collection system comprises apparatus for collecting the hydrogen gas at the wellhead of the mother wellbore.

* * * * *